United States Patent [19]
Ichida

[11] Patent Number: 5,897,451
[45] Date of Patent: Apr. 27, 1999

[54] BICYCLE DERAILLEUR HAVING OPERATING FORCES DISPOSED ON OPPOSITE SIDES OF A LINK PIVOT

[75] Inventor: Tadashi Ichida, Sakai, Japan

[73] Assignee: Shimano, Inc., Osaka, Japan

[21] Appl. No.: 08/846,567

[22] Filed: Apr. 29, 1997

[51] Int. Cl.⁶ ............................................. F16H 9/00
[52] U.S. Cl. ............................... 474/82; 474/80; 474/78
[58] Field of Search ................................. 474/80, 81, 78, 474/82, 69; 384/537, 536, 538; 185/45, 49, 52; 267/134, 136, 149, 150

[56] References Cited

U.S. PATENT DOCUMENTS

| | | | |
|---|---|---|---|
| 3,748,916 | 7/1973 | Morse | 74/217 B |
| 4,030,375 | 6/1977 | Nagano | 474/82 |
| 4,226,132 | 10/1980 | Nagano et al. | 474/82 |
| 4,241,617 | 12/1980 | Nagano et al. | 474/82 |
| 4,279,172 | 7/1981 | Nagano et al. | 474/82 |
| 5,518,456 | 5/1996 | Kojima et al. | 474/82 |
| 5,695,421 | 12/1997 | Fukuda | 474/82 |

FOREIGN PATENT DOCUMENTS

| | | | |
|---|---|---|---|
| 0 584 371 A1 | 3/1994 | European Pat. Off. . | |
| 0 655 386 A1 | 5/1995 | European Pat. Off. . | |
| 653347A1 | 5/1995 | European Pat. Off. | B62M 9/12 |
| 190582 | 7/1937 | Switzerland . | |
| 1008051 | of 1911 | United Kingdom | 474/82 |

OTHER PUBLICATIONS

European Search Report for EP 98303202.0, dated Aug. 19, 1998.

*Primary Examiner*—John A. Jeffery
*Assistant Examiner*—Marcus Charles
*Attorney, Agent, or Firm*—James A. Deland

[57] ABSTRACT

A bicycle derailleur includes a base member, a movable member supporting a chain guide, and a first link having first and second ends. The first end of the first link is movably mounted to the base member, and the second end of the first link is movably mounted to the movable member. A bias spring exerts a bias spring force on one side of a longitudinal axis of the first link and directed away from the movable member, and a control element is coupled to the first link for exerting a control element force on an opposite side of the longitudinal axis of the first link and directed away from the movable member. The spring and control element forces thus act primarily on the connection between the first link and the base member, thus relieving the forces from the connections between other derailleur components.

29 Claims, 4 Drawing Sheets

BICYCLE DERAILLEUR HAVING OPERATING FORCES DISPOSED ON OPPOSITE SIDES OF A LINK PIVOT

BACKGROUND OF THE INVENTION

The present invention is directed to bicycle derailleurs and, more specifically, to a bicycle derailleur having links pivotably mounted to a base member and a movable member through pivot pins where bearings are disposed at selected ones of the pivot pins.

FIG. 1 is a conceptual drawing of a conventional bicycle derailleur 10. Derailleur 10 includes a base member 14, a movable member 18, and links 22 and 24 coupling movable member 18 to base member 14 so that movable member 18 is capable of movement relative to base member 14. Base member 14 ordinarily is fixed to a bicycle frame (not shown), and movable member 18 ordinarily supports a chain guide (not shown) for moving a chain across a plurality of sprockets (not shown). Link 22 is pivotably coupled to base member 14 through a pivot pin 28 and to movable member 18 through a pivot pin 32. Similarly, link 24 is pivotably coupled to base member 14 through a pivot pin 36 and to movable member 18 through a pivot pin 40. Base member 14, movable member 18 and links 22 and 24 thus form a four-bar type linkage mechanism which, in this case, is in the form of a parallelogram. A bias spring 44 may be connected between diagonal corners of the linkage mechanism formed by base member 14, movable member 18 and links 22 and 24 to create a biasing force $F_B$ which biases movable member 18 in a desired direction. In FIG. 1, base member 14 is stationary, so movable member 18 is biased upward when bias spring 44 is connected as shown.

Since bias spring 44 is connected between diagonal corners of the linkage mechanism, substantial spring force is applied to all four pivot points located at pivot pins 28, 32, 36 and 40, thus creating enhanced friction at each pivot pin. To compensate for such friction, a bearing 50 is mounted around pivot pin 28 between pivot pin 28 and link 22, a bearing 54 is mounted around pivot pin 32 between pivot pin 32 and link 22, a bearing 58 is mounted around pivot pin 36 between pivot pin 36 and link 24, and a bearing 62 is mounted around pivot pin 40 between pivot pin 40 and link 24. While bearings 50, 54, 58 and 62 help to overcome the friction between pivot pins 28, 32, 36 and 40 and links 22 and 24, the bearings make the cost of the derailleur much greater.

SUMMARY OF THE INVENTION

The present invention is directed to a bicycle derailleur which achieves low friction between the links and the pivot pins while requiring fewer bearings between the links and the pivot pins than prior art derailleurs. In one embodiment of the present invention, a bicycle derailleur includes a base member, a movable member supporting a chain guide, and a first link having first and second ends. The first end of the first link is movably mounted to the base member, and the second end of the first link is movably mounted to the movable member. A bias spring exerts a bias spring force on one side of a longitudinal axis of the first link and directed away from the movable member, and a control element is coupled to the first link for exerting a control element force on an opposite side of the longitudinal axis of the first link and directed away from the movable member. The spring and control element forces thus act primarily on the connection between the first link and the base member, thus relieving the forces from the connections between other derailleur components. As a result, a low friction derailleur may be constructed using a single bearing at the connection between the first end of the first link and the base member.

In another embodiment of the present invention, a bicycle derailleur includes a base member, a movable member supporting a chain guide, and first and second links coupling the base member to the movable member so that the movable member is capable of movement relative to the base member. More specifically, the first link is pivotably coupled to the base member through a first pivot pin and to the movable member through a second pivot pin. Similarly, the second link is pivotably coupled to the base member through a third pivot pin and to the movable member through a fourth pivot pin. A bias spring is mounted to the derailleur such that a first end of the bias spring is mounted to the base member offset from the first pivot pin, and a second end of the bias spring is mounted along the path of the first link. For example, the bias spring may be inclined away from the first and second links, and the second end of the bias spring may be located at an intermediate position of the first link or at the second end of the first link at the second pivot pin. This connection of the bias spring removes the substantial spring forces from three out of the four pivot points, so a low friction derailleur may be constructed using a single bearing.

In a more specific embodiment, a bearing is mounted to the first pivot pin between the first end of the first link and the pivot pin. The second end of the first link is pivotably mounted to the movable member through the second pivot pin so that the second end of the first link contacts the second pivot pin. The first end of the second link is pivotably mounted to the base member through the third pivot pin so that the first end of the second link contacts the third pivot pin, and the second end of the second link is pivotably mounted to the movable member through the fourth pivot pin so that the second end of the second link contacts the fourth pivot pin. If further reduction in friction is desired, the second end of the bias spring may be mounted to the first link through a mounting post, and a second bearing may be mounted to the mounting post between the second end of the bias spring and the mounting post.

DETAILED DESCRIPTION OF THE EMBODIMENTS

Figure 1:
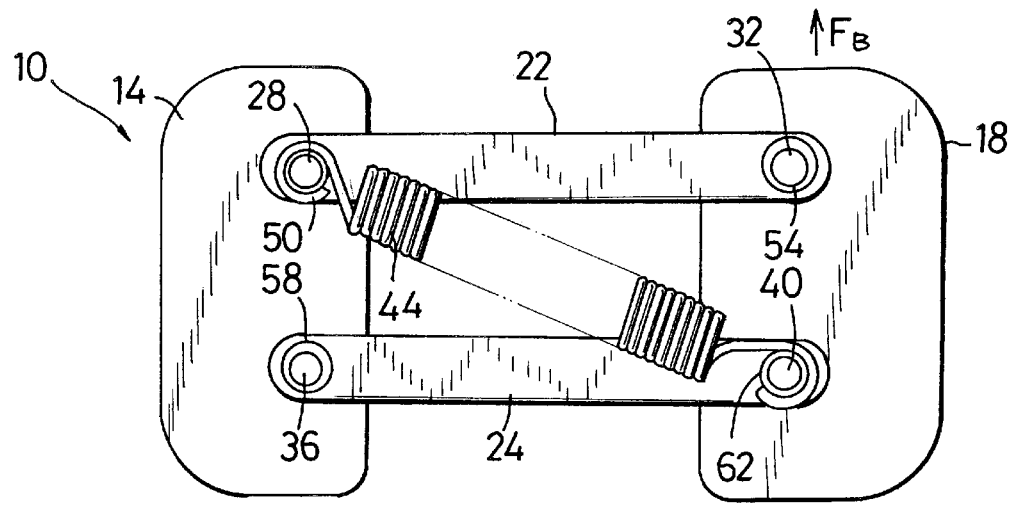
FIG. 1 is a conceptual diagram of a prior art derailleur.
Figure 2:
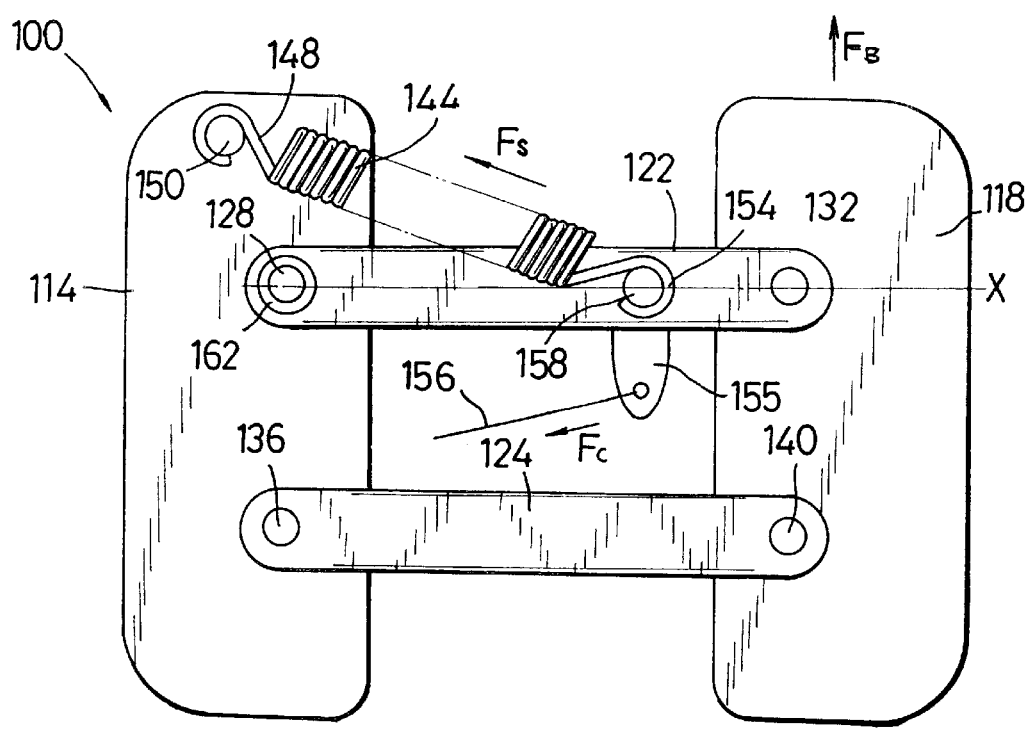
FIG. 2 is a conceptual diagram of a particular embodiment of a derailleur constructed according to the present invention.

FIG. 2 is a conceptual diagram of a particular embodiment of a derailleur 100 constructed according to the present invention. Derailleur 100 includes a base member 114, a movable member 118, and links 122 and 124 coupling movable member 118 to base member 114 so that movable member 118 is capable of movement relative to base member 114. Link 122 is pivotably coupled to base member 114 through a pivot pin 128 and to movable member 118 through a pivot pin 132. Similarly, link 124 is pivotably coupled to base member 114 through a pivot pin 136 and to movable member 118 through a pivot pin 140. Base member 114, movable member 118 and links 122 and 124 thus form a four-bar type linkage mechanism.

A bias spring 144 is mounted to derailleur 100 such that a first end 148 of bias spring 144 is mounted to a mounting post 150 offset from first pivot pin 128. A second end 154 of the bias spring is mounted to a mounting post 158 positioned along the path of link 122. In this embodiment, bias spring 144 is inclined away from the links 122 and 124, and the second end 154 of bias spring 144 is located at an intermediate position of link 122 between pivot pins 128 and 132. An actuating arm 155 extends from the side of link 122, and a control element in the form of a cable 156 is connected to the free end of actuating arm 155 for pulling movable member 118 against the biasing force $F_B$ of bias spring 144.

From inspection of FIG. 2 it should be apparent that bias spring 144 produces a spring force $F_S$ which is inclined to one side of a longitudinal axis X of link 122 away from movable member 118, and control cable 156 produces a control element force $F_C$ which is inclined to the opposite side of the longitudinal axis X of link 122 away from movable member 118. This connection of the bias spring 144 and control cable 156 removes the substantial forces from the connections at pivot pins 132, 136 and 140, so no bearings are needed at those locations. However, substantial forces still exist at the connection between pivot pin 128 and link 122, so a bearing 162 may be mounted around pivot pin 128 between link 122 and pivot pin 128.

Figure 3:
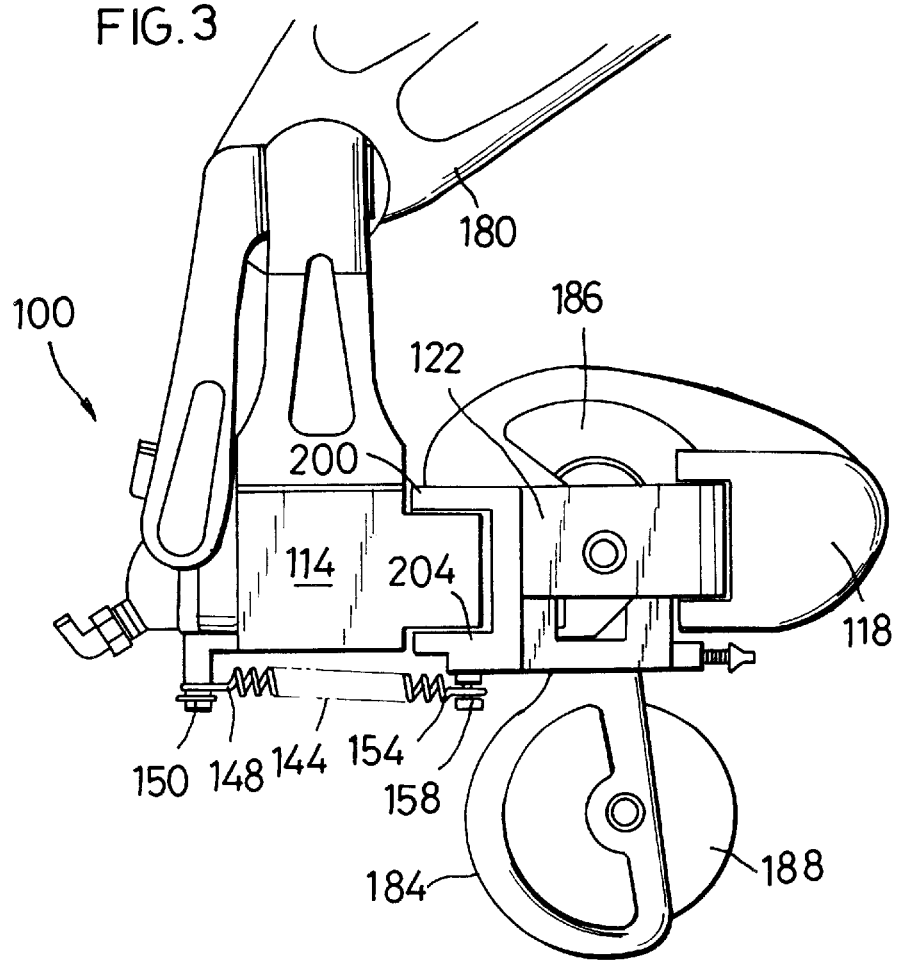
FIG. 3 is a side view of a particular embodiment of an actual derailleur constructed according to the present invention.
Figure 4:
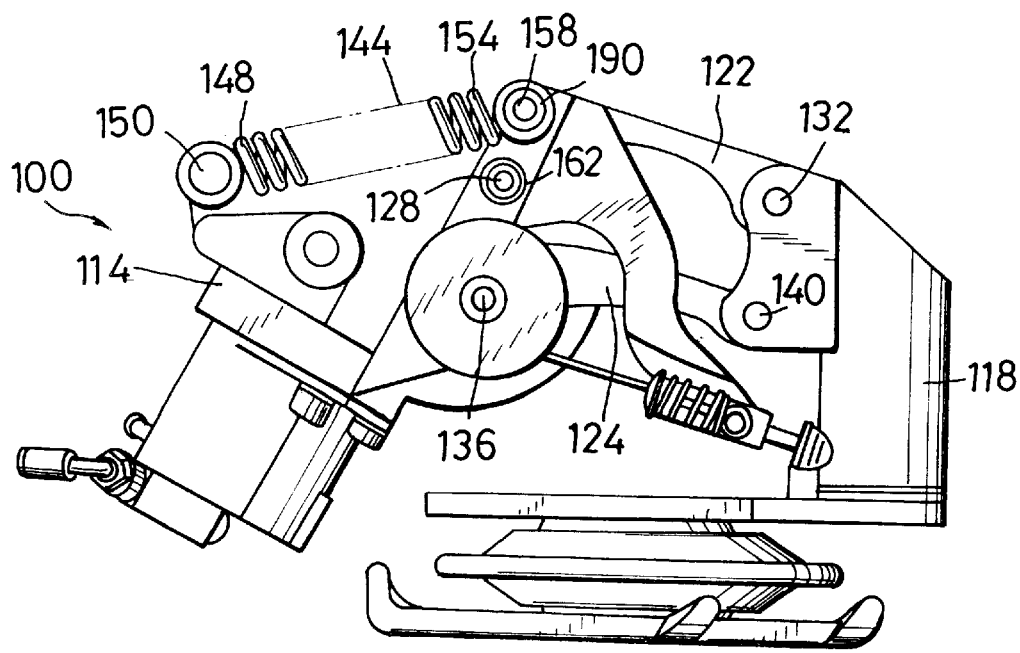
FIG. 4 is a bottom view of the derailleur shown in FIG. 3.

FIG. 3 is a side view of a particular embodiment of an actual derailleur constructed according to the conceptual diagram shown in FIG. 2, and FIG. 4 is a bottom view of the derailleur shown in FIG. 3. Components that correspond to the components shown in FIG. 2 are numbered the same. As shown in FIGS. 3 and 4, base member 114 is mounted to a bicycle frame 180, and movable member 118 supports a chain guide 184 having a guide pulley 186 and a tension pulley 188. Bearing 162 is mounted around pivot pin 128 between pivot pin 128 and link 122, but such bearings are not mounted around pivot pins 132, 136 or 140. Instead, links 122 and 124 are allowed to contact pivot pins 132, 136 and 140.

Figure 5:
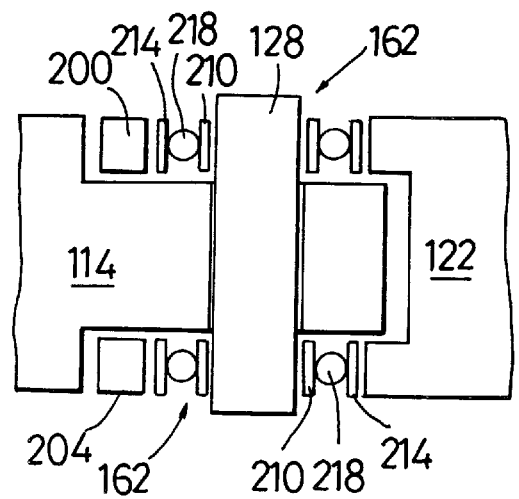
FIG. 5 is a detailed view showing the connection between the first link and the base member of the derailleur shown in FIG. 4.

FIG. 5 is a detailed cross sectional view showing the connection between link 122 and base member 114 in the derailleur shown in FIGS. 3 and 4. As shown in FIG. 5, link 122 includes an upper collar 200 and a lower collar 204. Accordingly, a bearing 162 is mounted at each collar 200 and 204. Each bearing 162 includes an inner ring 210, an outer ring 214, and a plurality of balls 218 mounted in the annular space defined by inner ring 210 and outer ring 214.

Figure 6:
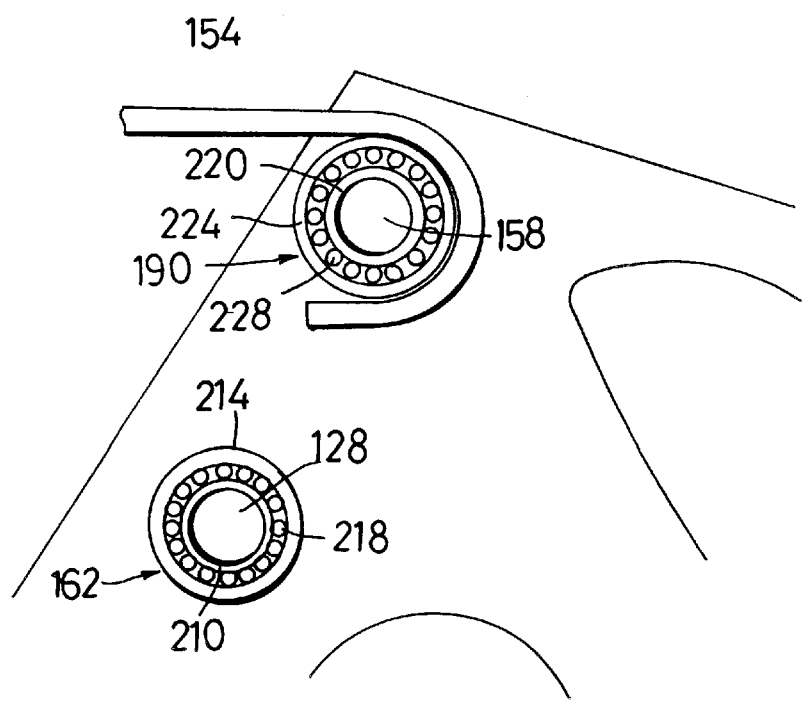
FIG. 6 is a detailed view showing the connection between the bias spring and the base member of the derailleur shown in FIG. 4.

Since link 122 undergoes substantial movement during operation of derailleur 100, substantial friction also may arise between spring end 154 and mounting post 158. A bearing 190 may be mounted around mounting post 158 between mounting post 158 and spring end 154 to reduce this friction, although such a bearing is not mandatory. FIG. 6 is a detailed view showing how spring end 154 is mounted to mounting post 158 through bearing 190. As with bearing 162 mounted around pivot pin 128, bearing 190 includes an inner ring 220, an outer ring 224 and a plurality of balls 228 mounted in the annular space defined by inner ring 220 and outer ring 228.

Figure 7:
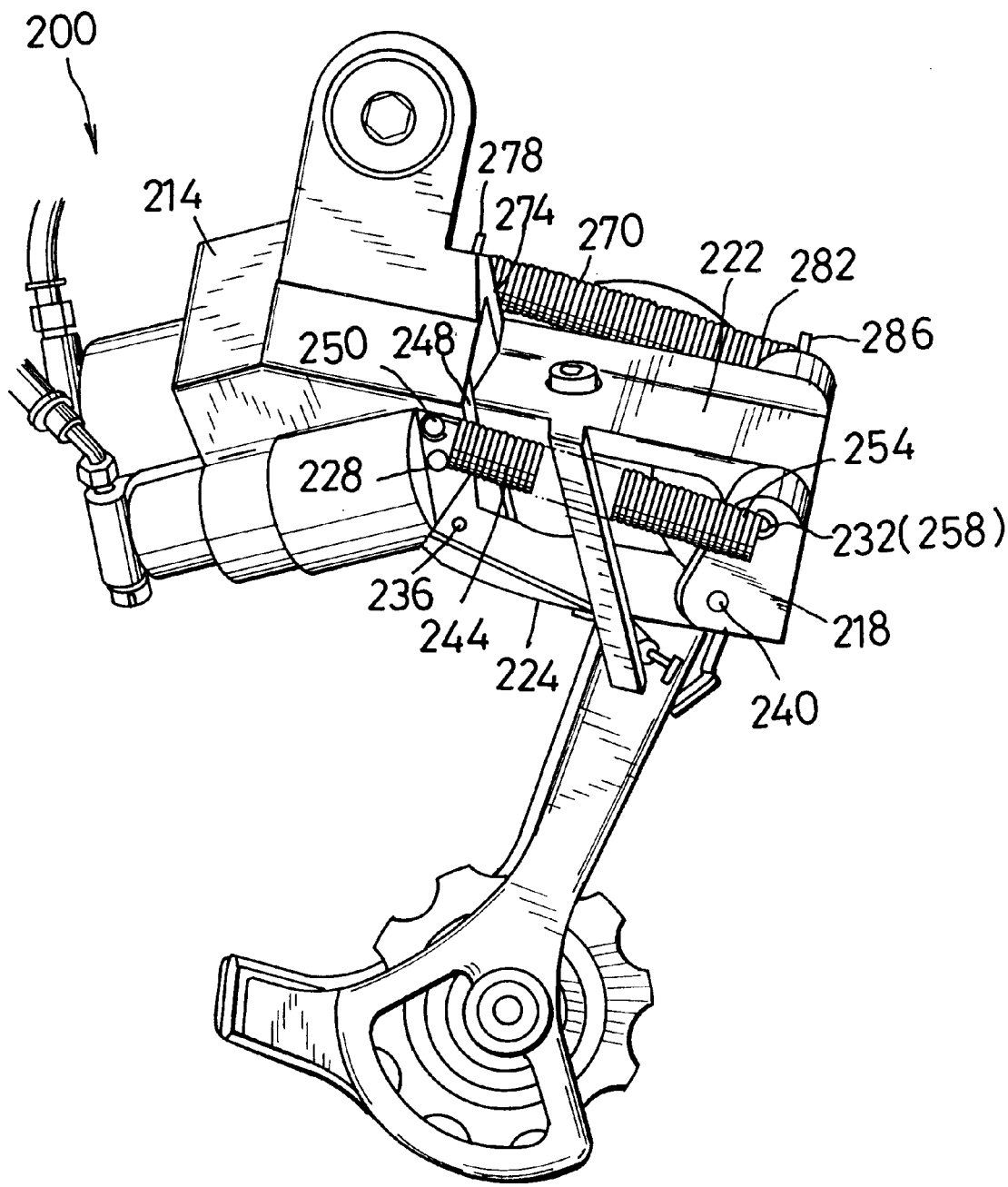
FIG. 7 is a side view of an alternative embodiment of an actual derailleur constructed according to the present invention.

FIG. 7 is a side view of an alternative embodiment of an actual derailleur 200 constructed according to the present invention. This embodiment differs from the embodiment shown in FIGS. 3 and 4 in that two bias springs are used, and the second end of each springs mounted to the pivot pin that connects the upper link to the movable member. More specifically, derailleur 200 includes a base member 214, a movable member 218, and links 222 and 224 coupling movable member 218 to base member 214 so that movable member 218 is capable of movement relative to base member 214. Link 222 is pivotably coupled to base member 214 through a pivot pin 228 and to movable member 218 through a pivot pin 232. Similarly, link 224 is pivotably coupled to base member 214 through a pivot pin 236 and to movable member 218 through a pivot pin 240. Base member 214, movable member 218 and links 222 and 224 thus form a four-bar type linkage mechanism.

A bias spring 244 is mounted to derailleur 200 on one side of link 222 such that a first end 248 of bias spring 244 is mounted to a mounting post 250 offset from first pivot pin 228. A second end 254 of bias spring 244 is mounted to a mounting post 258 which, in this embodiment, is an extension of pivot pin 232. Another bias spring 270 is mounted on the opposite side of link 222 such that a first end 274 of bias spring 270 is mounted to a mounting post 278 offset from first pivot pin 228. A second end 282 of bias spring 270 is mounted to a mounting post 286 which also is an extension of pivot pin 232. If desired, mounting posts 250 and 278 may be formed as a single post that extends in a straight line through base member 214.

As with the embodiment shown in FIGS. 3 and 4, bearings may be mounted around pivot pin 228 between pivot pin 228 and link 222. In this embodiment, however, substantial pivoting occurs between spring ends 248 and 274 and their associated mounting posts 250 and 278, so further bearings may be mounted around mounting posts 250 and 278 between mounting posts 250, 278 and the corresponding spring ends 248, 274. The bearings may be constructed as shown in FIGS. 5 and 6.

While the above is a description of various embodiments of the present invention, further modifications may be employed without departing from the spirit and scope of the present invention. For example, while bearings constructed of an inner ring, an outer ring and a plurality of balls disposed in the annular space between the inner ring and the outer ring were used in the described embodiments, other types of bearings such as cylindrical bearings or bushings could be used instead. Thus, the scope of the invention should not be limited by the specific structures disclosed. Instead, the true scope of the invention should be determined by the following claims.

What is claimed is:

1. A bicycle rear derailleur comprising:

a base member;

a movable member supporting a chain guide;

a first link having first and second ends;

a second link having first and second ends;

wherein the first end of the first link is movably mounted to the base member at a first first link pivot location, and wherein the second end of the first link is movably mounted to the movable member at a second first link pivot location;

wherein the first end of the second link is movably mounted to the base member at a first second link pivot location, and wherein the second end of the second link is movably mounted to the movable member at a second second link pivot location;

a spring having a first portion connected along a path of the first link for exerting a spring force directed away from a first side of the first link and directed away from the movable member;

wherein a second portion of the spring is connected to the base member offset from the first second link pivot location; and an actuating arm extending from the first link for coupling to a control element.

2. The derailleur according to claim 1 wherein the first end of the first link is pivotably mounted to the base member through a first pivot pin.

3. The derailleur according to claim 2 further comprising a first bearing mounted to the first pivot pin between the first end of the first link and the first pivot pin.

4. The derailleur according to claim 2 wherein the second end of the first link is pivotably mounted to the movable member through a second pivot pin, wherein the first end of the second link is pivotably mounted to the base member through a third pivot pin, and wherein the second end of the second link is pivotably mounted to the movable member through a fourth pivot pin.

5. The derailleur according to claim 4 further comprising a first bearing mounted to the first pivot pin between the first end of the first link and the first pivot pin.

6. The derailleur according to claim 5 wherein the second end of the first link is pivotably mounted to the movable member so that the second end of the first link contacts the second pivot pin.

7. The derailleur according to claim 6 wherein the first end of the second link is pivotably mounted to the base member so that the first end of the second link contacts the third pivot pin, and wherein the second end of the second link is pivotably mounted to the movable member so that the second end of the second link contacts the fourth pivot pin.

8. The derailleur according to claim 5 wherein an end of the spring is mounted to the first link through a mounting member, and further comprising a second bearing mounted to the mounting member between the end of the spring and the mounting member.

9. The derailleur according to claim 5 wherein an end of the spring is mounted to the base member through a mounting member, and further comprising a second bearing mounted to the mounting member between the end of the spring and the mounting member.

10. The derailleur according to claim 1 wherein the actuating arm extends at least partially in an opposite direction from the first side of the first link.

11. The derailleur according to claim 1 wherein the second link is connected to the base member through a pivot pin, and wherein the second portion of the spring is not connected to the pivot pin.

12. The derailleur according to claim 1 wherein the first link is connected to the movable member through a pivot pin, and wherein the first portion of the spring is not connected to the pivot pin.

13. The derailleur according to claim 1 wherein the first link is connected to the movable member through a first pivot pin, wherein the second link is connected to the base member through a second pivot pin, wherein the first portion of the spring is not connected to the first pivot pin, and wherein the second portion of the spring is not connected to the second pivot pin.

14. A bicycle rear derailleur comprising:

a base member;

a movable member supporting a chain guide;

a first link;

wherein the first link has a first end pivotably mounted to the base member through a first pivot pin;

a first bearing mounted to the first pivot pin between the first end of the first link and the first pivot pin;

wherein the first link has a second end pivotably mounted to the movable member through a second pivot pin so that the second end of the first link contacts the second pivot pin;

a second link;

wherein the second link has a first end pivotably mounted to the base member through a third pivot pin so that the first end of the second link contacts the third pivot pin;

wherein the second link has a second end pivotably mounted to the movable member through a fourth pivot pin so that the second end of the second link contacts the fourth pivot pin;

a first bias spring;

wherein the first bias spring has a first end mounted to the base member offset from the first pivot pin;

wherein the first bias spring has a second end mounted along the path of the first link between the first pivot pin and the second pivot pin so that the first bias spring extends away from a first side of the first link; and an actuating arm extending from the first link.

15. The derailleur according to claim 14 wherein the second end of the first bias spring is mounted to the first link at a position between the first pivot pin and the second pivot pin.

16. The derailleur according to claim 14 wherein the second end of the first bias spring is mounted to the first link at the second pivot pin.

17. The derailleur according to claim 14 wherein the first bias spring is inclined away from the first link and the second link.

18. The derailleur according to claim 17 wherein the second end of the first bias spring is mounted to the first link at a position between the first pivot pin and the second pivot pin.

19. The derailleur according to claim 17 wherein the second end of the first bias spring is mounted to the first link at the second pivot pin.

20. The derailleur according to claim 14 wherein the second end of the first bias spring is mounted to the first link through a mounting member, and further comprising a second bearing mounted to the mounting member between the second end of the first bias spring and the mounting member.

21. The derailleur according to claim 14 wherein the first bias spring is positioned on a lateral side of the first link.

22. The derailleur according to claim 21 further comprising a second bias spring positioned on an opposite lateral side of the first link, wherein the second bias spring has a first end mounted to the base member offset from the first pivot pin, and wherein the second bias spring has a second end mounted along the path of the first link so that the second bias spring extends away from the first side of the first link.

23. The derailleur according to claim 22 wherein the second end of the first bias spring and the second end of the second bias spring are both mounted to the first link at a position between the first pivot pin and the second pivot pin.

24. The derailleur according to claim 22 wherein the second end of the first bias spring and the second end of the second bias spring are both mounted to the first link at the second pivot pin.

25. The derailleur according to claim 22 wherein the first bias spring and the second bias spring both are inclined away from the first link and the second link.

26. The derailleur according to claim 22 wherein the first end of the first bias spring is mounted to the base member through a first mounting member, wherein the first end of the second bias spring is mounted to the base member through a second mounting member, and further comprising:

- a second bearing mounted to the first mounting member between the first end of the first bias spring and the first mounting member; and
- a third bearing mounted to the second mounting member between the first end of the second bias spring and the second mounting member.

27. A bicycle rear derailleur comprising:

a base member;

a movable member supporting a chain guide;

a first link pivotably mounted to the base member at a first pivot location and pivotably mounted to the movable member at a second pivot location;

a spring having a first end connected to the base member and a second end connected along a path of the first link between the first pivot location and the second pivot location but not at the second pivot location;

wherein the spring includes a plurality of coils surrounding a spring axis for exerting a spring force extending along the spring axis so that the first link is biased for rotation in a first direction; and an actuating arm disposed along a path of the first link for coupling to a control element.

28. The bicycle rear derailleur according to claim 27 wherein the actuating arm extends at least partially in a second direction opposite the first direction.

29. The bicycle rear derailleur according to claim 27 wherein the actuating arm extends laterally from the first link and originates between the first pivot location and the second pivot location but not at the second pivot location.

* * * * *